United States Patent [19]

Gordos

[11] 4,221,528
[45] Sep. 9, 1980

[54] AUTOMOTIVE LIFTING DEVICE

[76] Inventor: Ambrose L. Gordos, 4301 E. 2nd St., Apt. 1E, Long Beach, Calif. 90803

[21] Appl. No.: 55,540

[22] Filed: Jul. 9, 1979

[51] Int. Cl.³ .............................................. B60R 9/06
[52] U.S. Cl. .................................. 414/540; 224/310; 414/462; 414/463
[58] Field of Search ............... 414/426, 427, 462, 463, 414/464, 465, 466, 540, 541, 542; 224/42.06, 42.43, 42.44, 309, 310; 212/1; 254/188, 194, 195; 296/37.2, 76

[56] References Cited

U.S. PATENT DOCUMENTS

| | | | |
|---|---|---|---|
| 2,091,071 | 8/1937 | Girl | 414/466 |
| 2,320,856 | 6/1943 | Ehlers | 414/466 |
| 2,793,768 | 5/1957 | Schaedler | 414/541 |
| 2,823,069 | 2/1958 | Walker | 414/463 X |
| 3,473,680 | 10/1969 | Downer | 414/462 |
| 3,656,637 | 4/1972 | Lynn et al. | 414/462 X |
| 3,804,263 | 4/1974 | Castonguay | 414/462 X |

Primary Examiner—L. J. Paperner
Attorney, Agent, or Firm—William C. Babcock

[57] ABSTRACT

Set out herein is a modification to an automobile comprising a plurality of attachment channels deployed either on the interior of a hood or a trunk lid, each attachment channel being conformed to receive a telescoping bar to which a block and tackle may be attached for lifting heavy items like spare tires and the like. The hood or trunk lid may be further modified to include two pivoted braces which may be deployed against serrated supports attached to the automobile body. Thus the hood surface itself becomes part of the lifting structure allowing for convenient withdrawal of heavy items. This lifting structure may be utilized together with a fishnet or canvas sling conformable to various shapes to extend the utility thereof for lifting objects other than the spare tire.

8 Claims, 8 Drawing Figures

U.S. Patent  Sep. 9, 1980  4,221,528
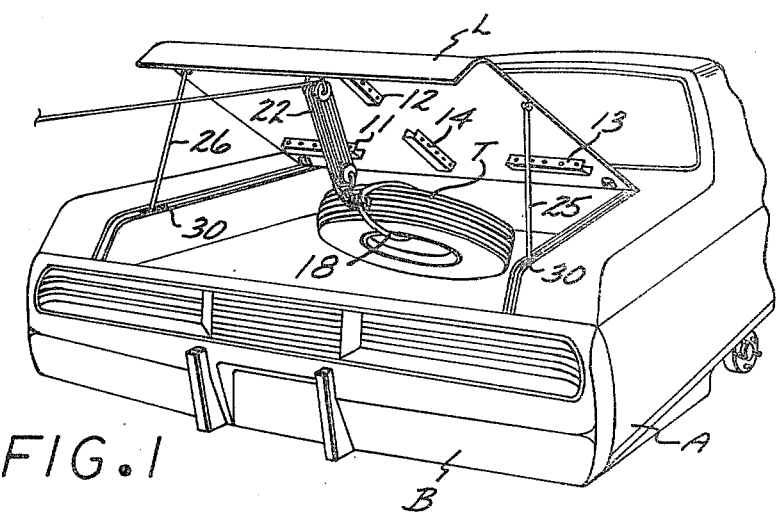
FIG.1
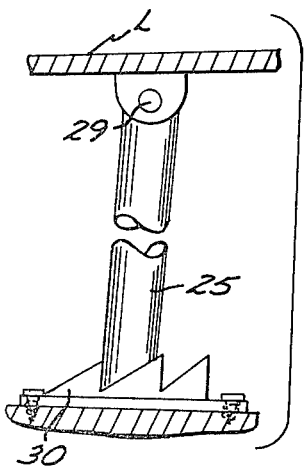
FIG.4
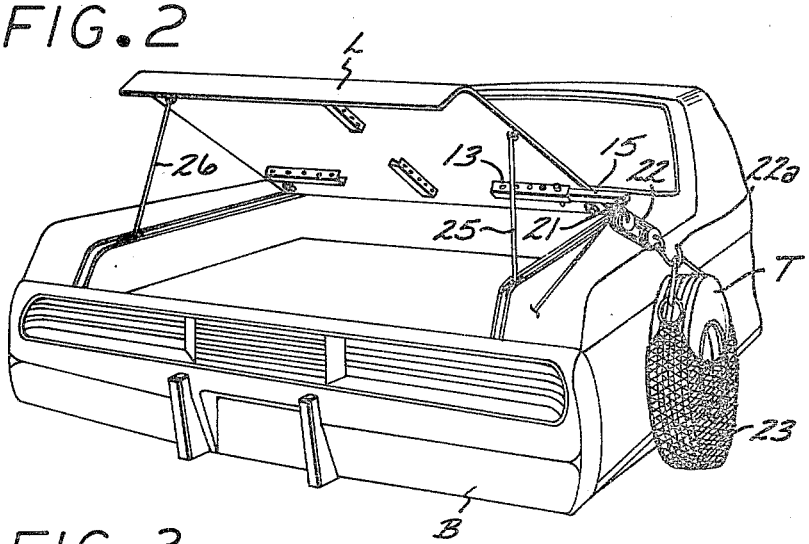
FIG.2
FIG.5
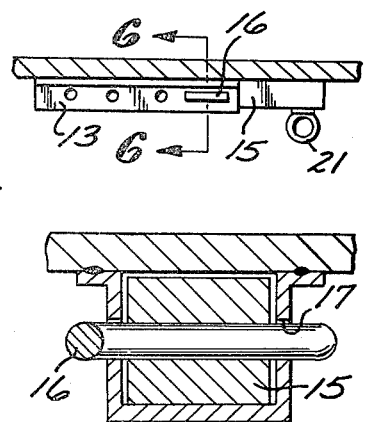
FIG.6
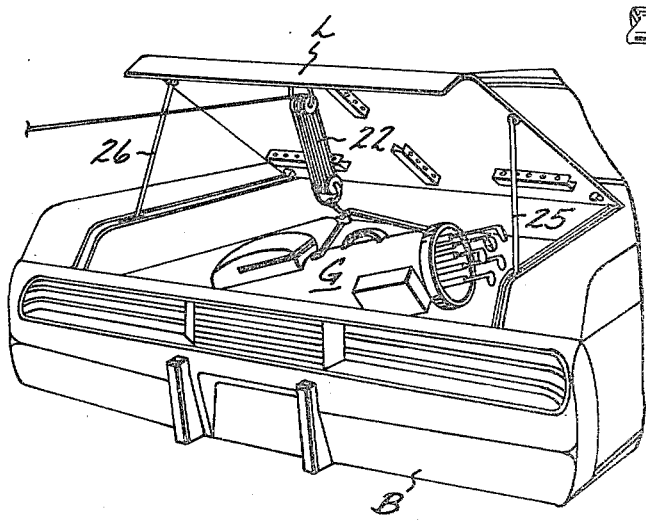
FIG.3
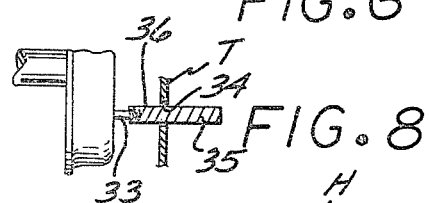
FIG.8
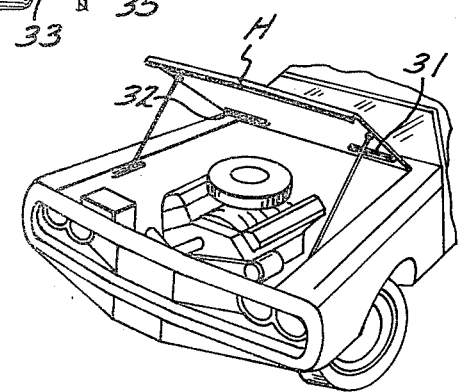
FIG.7

AUTOMOTIVE LIFTING DEVICE

BACKGROUND OF THE INVENTION

1. Field of the Invention

The present invention relates to lifting devices, and more particularly to improvements in the automobile structure for adapting thereof to lift heavy objects and the like.

2. Description of the Prior Art

The weight and manipulative inconvenience entailed in removing and replacing a spare tire are quite often beyond the abilities of a driver, particularly a driver of small stature. Thus various aids have been developed in the past for assisting the withdrawal of a spare tire or other heavy device from the interior of the automobile, the device disclosed in U.S. Pat. No. 2,091,071 being typical. In each instance, such prior art devices entailed cumbersome structure which because of its size and complexity required extensive modification to the automobile or production allowances for the placement thereof. Thus the cost and complexity of such prior art structures prohibited the use thereof as an after market devices, to be conveniently installed in any automobile, in any point in the use thereof.

Because of the heavy wind loads applied on the hood of an automobile, the typical hood structure includes reinforcing members which when stationary carry no load. Similarly the trunk lid is typically reinforced by a second skin or frame on the interior thereof, once more, only for the purpose of absorbing the occassional loads applied thereto. This structure may be used to advantage in assisting the lifting of heavy objects either from the engine compartment or the trunk and it is with the foregoing advantage in mind that the present invention is set out.

SUMMARY OF THE INVENTION

Accordingly, it is the general purpose and object of the present invention to provide a structural assembly which when installed onto the hood or the trunk lid of an automobile will enable the use thereof for the lifting of objects.

Other objects of the invention are to provide a lifting mechanism deployed from the interior of the hood or the trunk lid of an automobile for withdrawing heavy objects deployed therebelow.

Further objects of the invention are to provide a modification assembly for use with an automobile for rendering the functions thereof operable to lift objects.

Briefly these and other objects are accomplished within the present invention by providing a plurality of channel segments each essentially of a half crossed section and eached adapted to be attached to the interior surfaces of the hood or the trunk lid of a passenger car. The channel segments are conformed to receive in sliding engagement on the interior thereof an elongate bar provided with an eye fitting at one end from which a block and tackle mechanism may be deployed. The extent of the sliding engagement of the bar within any one channel segment may be selected by way of a plurality of transverse holes which may be aligned with a bore extending through the bar. A pin inserted into the common interior of the holes in the bore will then retain the bar in a predetermined telescoping engagement providing a fixing point for the suspension of the block and tackle mechanism. The block and tackle mechanism, together with a canvas or net sling may then be used to withdraw any heavy objects located below the bar.

In order to support the hood or the trunk lid structure against collapse while withdrawing articles, two arm braces are provided, pivotally mounted proximate the lateral edges of each closure surface and deployable to engage serrated latching plates on the automobile structure. Thus the load imposed on the trunk lid or the hood is transferred to the body of the automobile and therethrough to ground by way of a triangulating arrangement which is both easily stored and convenient in use.

BRIEF DESCRIPTION OF THE DRAWINGS

FIG. 1 is a perspective illustration of an automobile trunk assembly incorporating the inventive modification set out herein;

FIG. 2 is yet another perspective illustration of the trunk of an automobile illustrating the alternative use of the inventive modification disclosed herein;

FIG. 3 is yet a further perspective illustration of the same trunk lid of an automobile illustrating the use of the inventive lifting device in deploying other objects;

FIG. 4 is a side view in detail of a pivotal arm brace useful with the invention herein;

FIG. 5 is a side view, in partial section, illustrating the detail arrangement of a sliding bar useful with the invention herein;

FIG. 6 is a sectional view taken along line 6—6 of FIG. 5;

FIG. 7 is a perspective illustration of an engine compartment of an automobile provided with the modification set out herein; and FIG. 8 is a view of the alignment of the bolt holes of the spare tire with the stud bolts.

DESCRIPTION OF THE SPECIFIC EMBODIMENT

As shown in FIGS. 1-6 a conventional automobile A normally provided with a trunk lid L which is hinged to cover a trunk cavity C, often includes a spare tire T on the inside thereof. Frequently the spare tire T is of a size and weight greater than that easily manipulated by the driver. Furthermore, the trunk cavity C is often utilized to transport various objects and because of the bumper structure B such objects have to be raised before they can be lifted out. Quite often this raising effort is beyond the capacity of the person attempting it and augmentation is required. For this reason the trunk lid L has attached thereto, on the interior surface thereof, a plurality of hat shaped channel segments 11–14 aligned at various points, each hat segment forming an interior longitudinal cavity for receiving therein a conformed rectangularly shaped bar 15. Bar 15 is conformed for telescopic translation on the interior of any one of the channel segments 11–14 being pinned at a selected extension by way of a T-shaped pin 16 extending through the common interior of a selected pair of two opposed openings 17 in the channel walls and a bore 18 formed in the bar 15. Thus the amount of exposure of bar 15 within any one of the particular channel segments can be selected providing for a convenient anchor point from which any lifting mechanism may be deployed. More specifically, as illustrated herein, channel segments 11 and 13 extend outwardly towards the edges of the trunk lid L allowing for the deployment of the bar therefrom in an exteriorly opposed alignment. Thus, for example, as illustrated in FIG. 2, bar 15 may be deployed to extend laterally above the fender well in the rear wheel well opening providing a suspension point for lifting a spare tire. Similarly channel segments 12 and 14 may be aligned in a longitudinal alignment with respect to the central axis of the automobile, channel segment 12 being directed rearwardly towards the extreme edge of the trunk lid L for providing withdrawal anchor points or a lifting anchor point in the course of removing a spare tire. To facilitate the attachment of any kind of a lifting device to the end of bar 15 there is formed thereon an eyelet 21 within which one end of the block and tackle mechanism 22 may be attached. The mechanism 22 as is conventional in such devices includes a movable hook 22a. The hood 22a may removably engage either an elongate pliable member 23a that forms a part of a net or canvas sling 23 as shown in FIG. 1 or a cable loop 18 that has alignable eyes 18a on the free ends thereof as shown in FIG. 2. In this manner the trunk lid L provides the function of a lifting structure, the user being subjected only to the work necessary to horizontally translate the object lifted which may be left suspended in the desired position or which may be adjusted upwardly and downwardly by the manipulation of the block and tackle 22. Since the weight of an object quite often exceeds the spring bias of the lids, it is further contemplated to include two arm braces 25 and 26 pivotally mounted on the inside surfaces of the lid L and aligned proximate the edges thereof. As shown in FIG. 4 arm brace 25 being also examplary of the arm brach 26 extends from a pivot 29 to engage a sawtooth serrated plate 30 on the opposing structure of the automobile A. Thus triangulation is achieved where one point of the lid is secured by the conventionally found hinges and the other points of the lid is supported against the body of the car by the arm braces.

As shown in FIG. 7 the automobile hood H may be similarly implemented with two transfersely directed channel segments 31 and 32. Channel segments 31 and 32 similar to segments 11 and 13 are aligned towards the front wheel well opening thus providing for the necessary manipulative convenience during the course of changing the front tire. It is to be understood that channels 31 and 32 are similarly provided with the necessary opening pairs 17 to allow the telescopic fixing of bar 15 on the interior thereof. Once more, the block and tackle mechanism 22 may be suspended therefrom which by connecting to the sling 23 will allow the manipulation of the tire.

When the invention is used in removing a spare tire T from the trunk cavity C the tire may initially have the loop 18 extended around a section of the tire, and the eyes 18a being engaged by the hook 22a. The block and tackle 22 is supported from eyelet 21 of bar 15 when the latter is in channel segment 12. The arm 25, 26 are angularly disposed and in engagement with plates 30 to hold trunk lid L in an upwardly and rearwardly extending angle relative to automobile A as shown in FIG. 1. By manipulating the block and tackle mechanism 22 the space tire and associated wheel is first pulled rearwardly in the cavity C.

The spare tire T is preferably lowered onto a sling 23 formed from a strong pliable netting that rests on the ground, with the sling including a hook engageable member 23a. The spare tire T with the sling 23 extending therearound is moved or rolled to a position adjacent the wheel that has a deflated tire, which is the right-hand rear wheel as illustrated in FIG. 2. If the right-hand rear tire is to be changed as shown in FIG. 2, the block and tackle mechanism 22 is now moved and supported from eyelet 21 when bar 15 is disposed in segment 13. The right rearward portion of the automobile A will have been elevated by a jack (not shown), and the rear wheel removed. The spare tire T may now be elevated by the block and tackle 22 when the latter is engaging engageable member 23a for the spare tire to be transversely aligned with the wheel supporting stud bolts 33.

To facilitate aligning the bolt holes 34 of spare tire wheel T with stud bolts 33, a pin 35 may be provided that has a tapped cavity 36 in one end thereof that removably engages one of the stud bolts. One of the bolt holes 34 of the spare tire wheel T is now slid onto the pin 35, with the balance of the bolt holes 34 being automatically aligned with their respective stud bolts 33. The nuts (not shown) are screwed onto the stud bolts 33. Pin 35 is now unscrewed from the stud bolt 33 on which it was mounted and replaced by a nut (not shown).

The block and tackle mechanism 22, bar 15 and the sling 23 or loop 18 used in mounting the tire are separated from segment 15 and stored in trunk cavity C until again needed. Should it be desired to lift a heavy object such as a golf bag G from cavity C, the block and tackle mechanism 22 may be used for this purpose as shown in FIG. 3, with the hook 22a removably engaging the handle G-1 of the bag.

The use and operation of the invention has been explained previously in detail and need not be repeated.

What is claimed is:

1. In an automobile having a frame and a trunk lid and a hood each pivotally mounted to articulate relative said frame for enclosing subjacent cavities therein the improvement comprising:
    a plurality of first elongate channels each having a substantially hat shaped section attached to the underside of said lid in an alignment proximate the pivotal attachment thereof, each said first elongate channel being disposed towards the lateral edges of said lid to form first elongate passages therewith;
    a plurality of second elongate channels disposed on the underside of said lid in substantially longitudinal alignment relative said frame to form second elongate passages therewith;
    a hoisting bar conformed for selective telescopic insertion into said first or second passages, said bar including an eyelet at one end thereof;
    pinning means insertable into said first or second channels and said bar for attaching said bar to a selected one of said channels at a predetermined level of telescopic insertion;
    bracing means pivotally connected to said lid and manually deployable to engage said frame for opposing the closing articulation thereof; and
    hoist means attachable to said eyelet for lifting articles from said automobile.

2. Apparatus according to claim 1 wherein:
    said bracing means includes a plurality of braces each pivotally secured to the underside of said lid and serrated engaging plates operatively mounted to said frame for engaging the free ends of said braces in an alignment opposing the inward articulation of said lid.

3. Apparatus according to claim 2 wherein:
    said automobile includes a plurality of wheel wells for accommodating road wheels; and said first channels are aligned substantially above selected ones of said wheel wells.

4. Apparatus according to claim 3 further comprising:
a plurality of third channels attached to the underside of said hood and aligned above selected other ones of said wheel wells for receiving said bar therein.

5. The apparatus as defined in claim 1 in which said hoist means is a block and tackle that includes a hook, and a pliable loop that has a pair of eyes that are engageable by said hook when said loop is extended around a portion of said article to be lifted.

6. The apparatus as defined in claim 5 in which said article is a spare tire disposed in the rearward portion of an automobile.

7. The apparatus as defined in claim 5 in which said article is a golf bag containing a plurality of clubs, said bag and clubs situated in the rearward portion of an automobile.

8. The apparatus as defined in claim 1 in which said hoist means is a block and tackle that includes a hook, and a pliable sling that may be extended around a spare tire, said sling including an engageable portion that may be removably engaged by said hook.

* * * * *